(12) United States Patent
Hayakawa

(10) Patent No.: US 7,621,452 B2
(45) Date of Patent: Nov. 24, 2009

(54) ELECTRONIC APPARATUS

(75) Inventor: Yoichi Hayakawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 481 days.

(21) Appl. No.: 11/217,969

(22) Filed: Sep. 1, 2005

(65) Prior Publication Data

US 2006/0049244 A1  Mar. 9, 2006

(30) Foreign Application Priority Data

Sep. 6, 2004  (JP) ............................. 2004-258135

(51) Int. Cl.
*G06K 7/00* (2006.01)
(52) U.S. Cl. .................. 235/435; 235/441; 235/451; 235/492; 399/9; 399/12; 399/13; 399/25; 399/37
(58) Field of Classification Search .............. 235/441, 235/451, 492, 435; 399/9, 25, 27, 37, 12, 399/13
See application file for complete search history.

(56) References Cited

U.S. PATENT DOCUMENTS 6,490,422 B2 * 12/2002 Harumoto ................. 399/27
6,807,380 B2 * 10/2004 Iida et al. ................... 399/12
7,008,456 B1 * 3/2006 Tanaka et al. .............. 726/35

FOREIGN PATENT DOCUMENTS

| JP | 11-154205 A | 6/1999 |
|---|---|---|
| JP | 2000-276562 A | 10/2000 |

* cited by examiner

*Primary Examiner*—Michael G Lee
*Assistant Examiner*—Ali Sharifzada
(74) *Attorney, Agent, or Firm*—Panitch Schwarze Belisario & Nadel LLP

(57) ABSTRACT

An electronic apparatus is capable of minimizing the increase in the capacity of a non-volatile memory provided in the wireless tag and of minimizing the increase in the time required for reading data. A sub unit such as a lid includes a wireless tag therein is detachably attached to an accommodating section such as a main body of the electronic apparatus. A reader-and-writer unit is housed in the accommodating section. When the sub unit is positioned in place in the accommodating section, the reader-and-writer unit communicates with the wireless tag to read data from the wireless tag and write data into the wireless tag. An anticipation signal generator provides an anticipation signal to the reader-and-writer unit when communication between the wireless tag and the reader-and-writer unit is anticipated to fail. The reader-and-writer unit is prevented from communicating with the wireless tag in accordance with the anticipation signal.

17 Claims, 12 Drawing Sheets

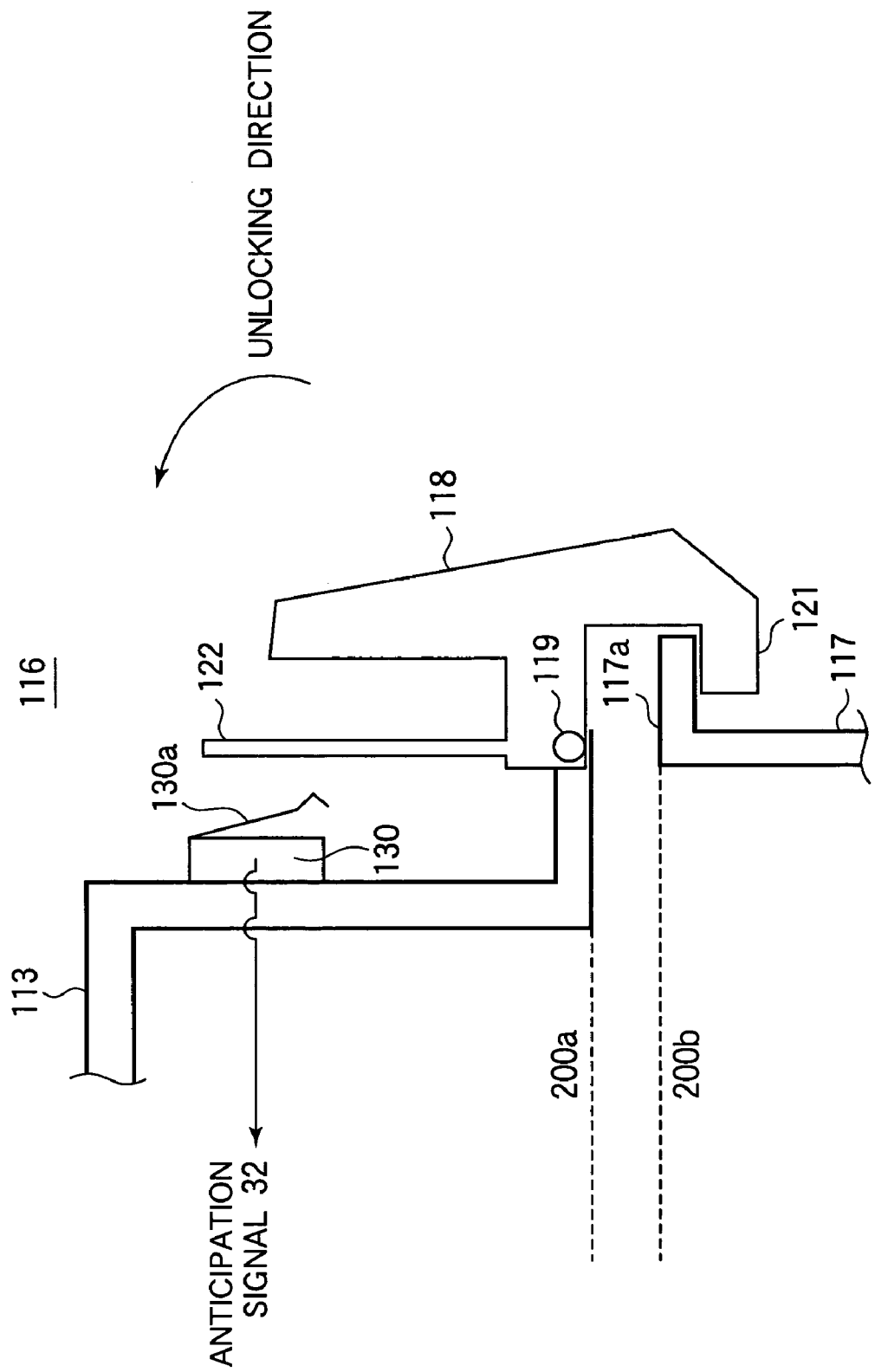

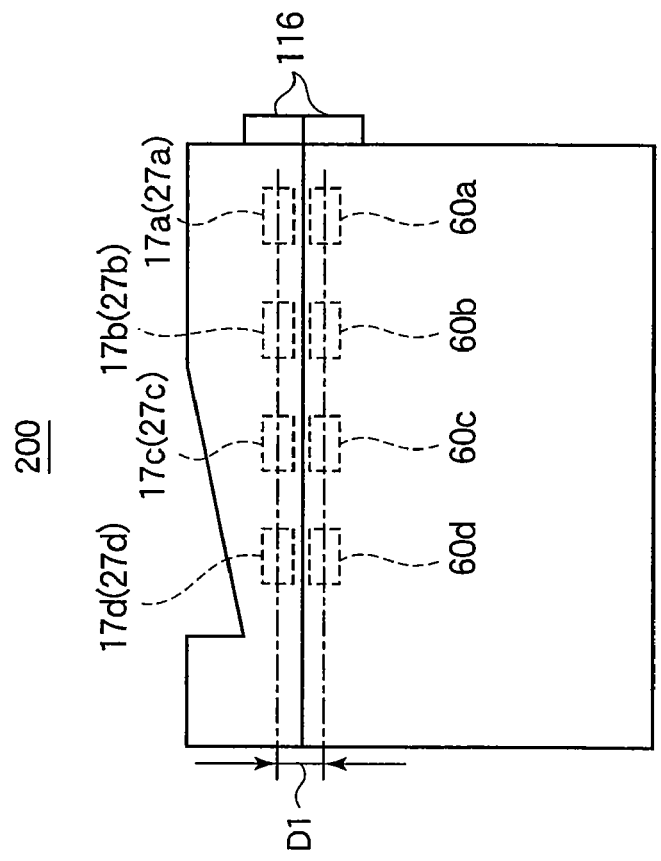
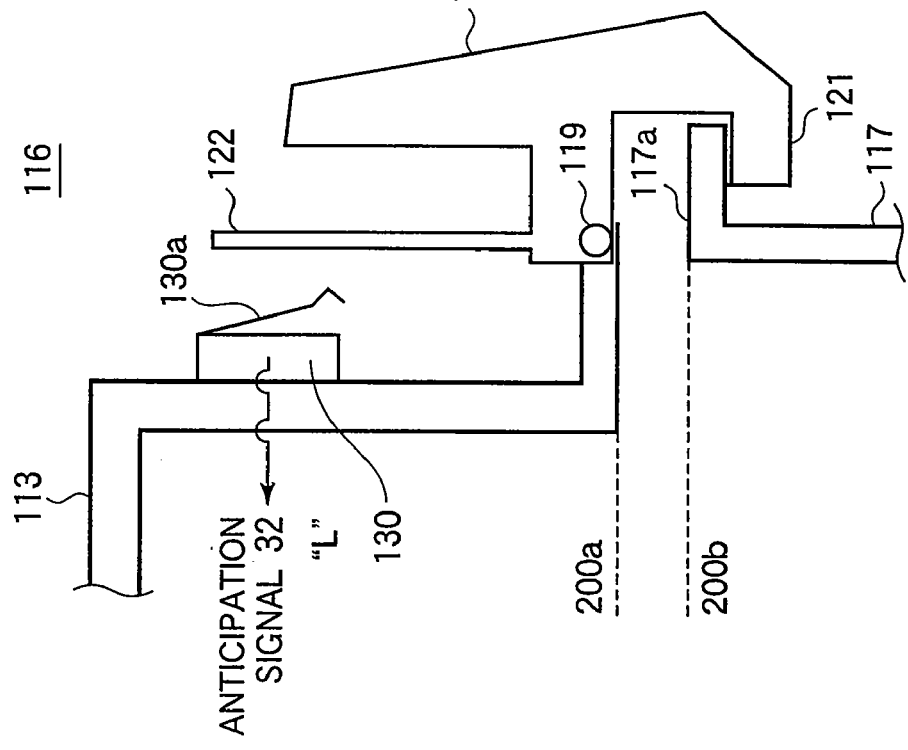

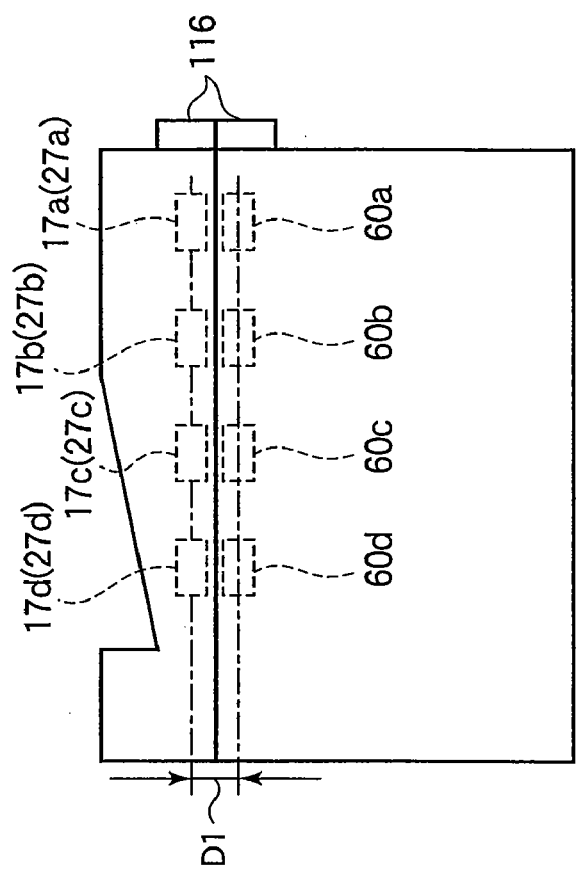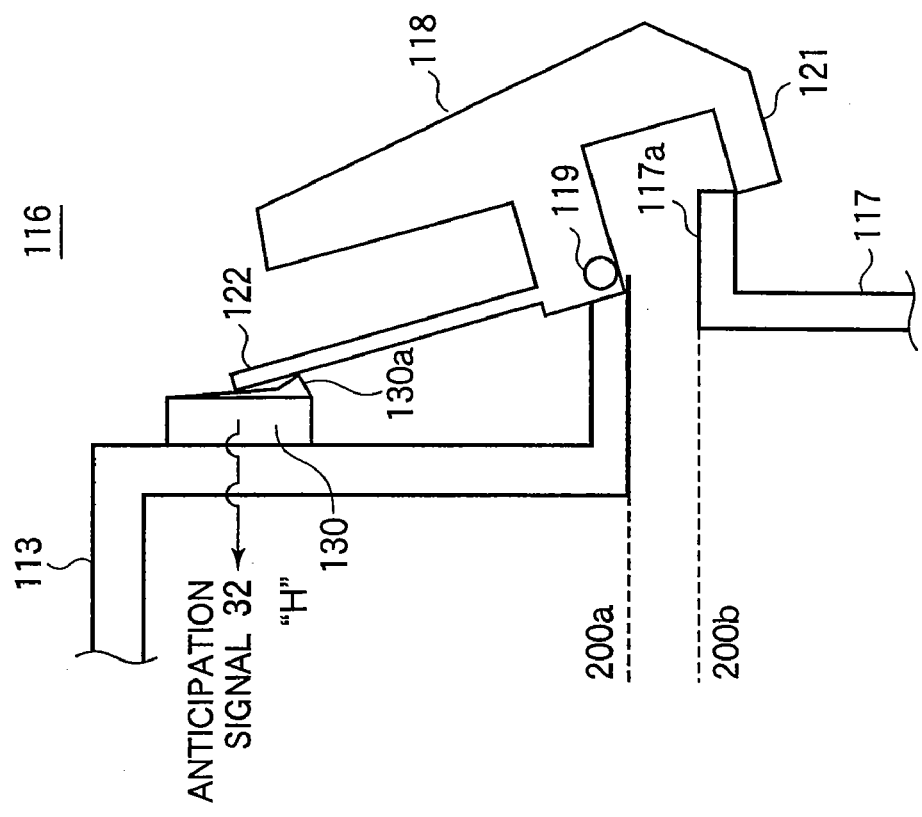

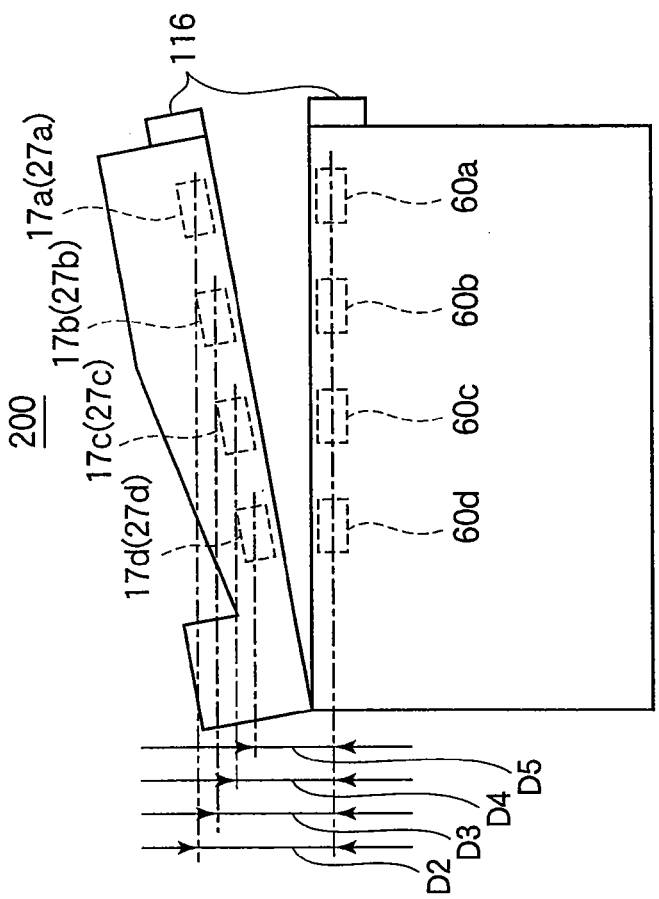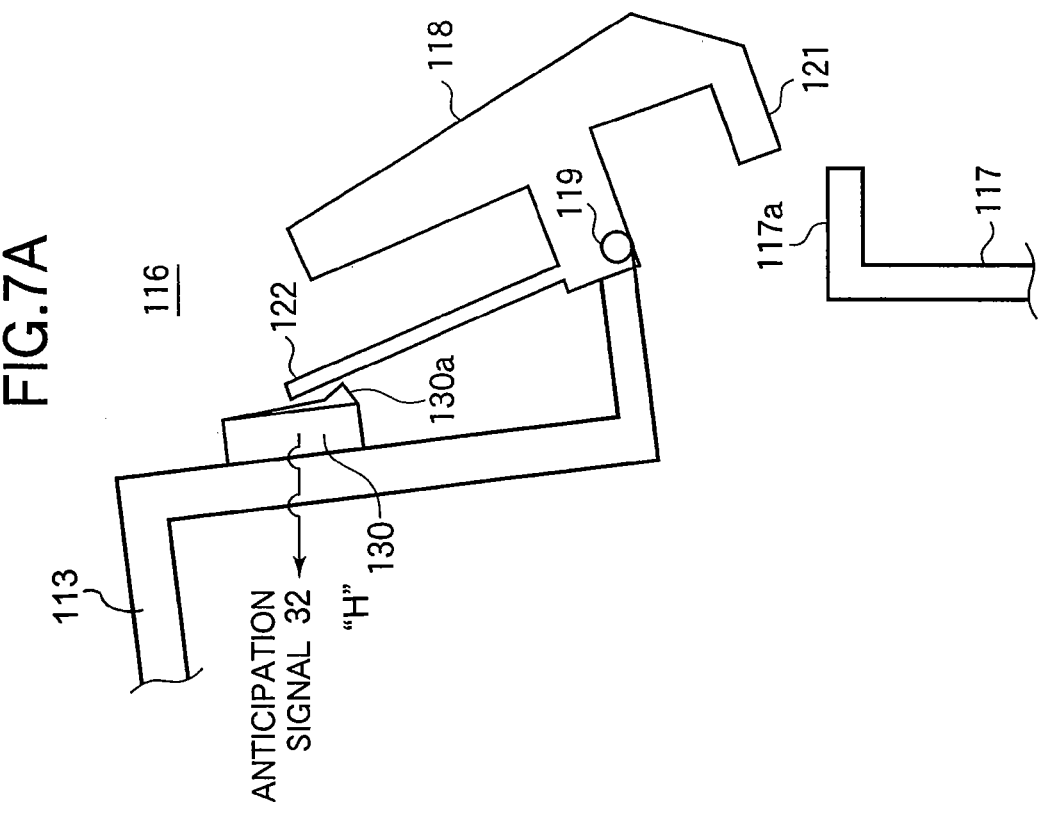

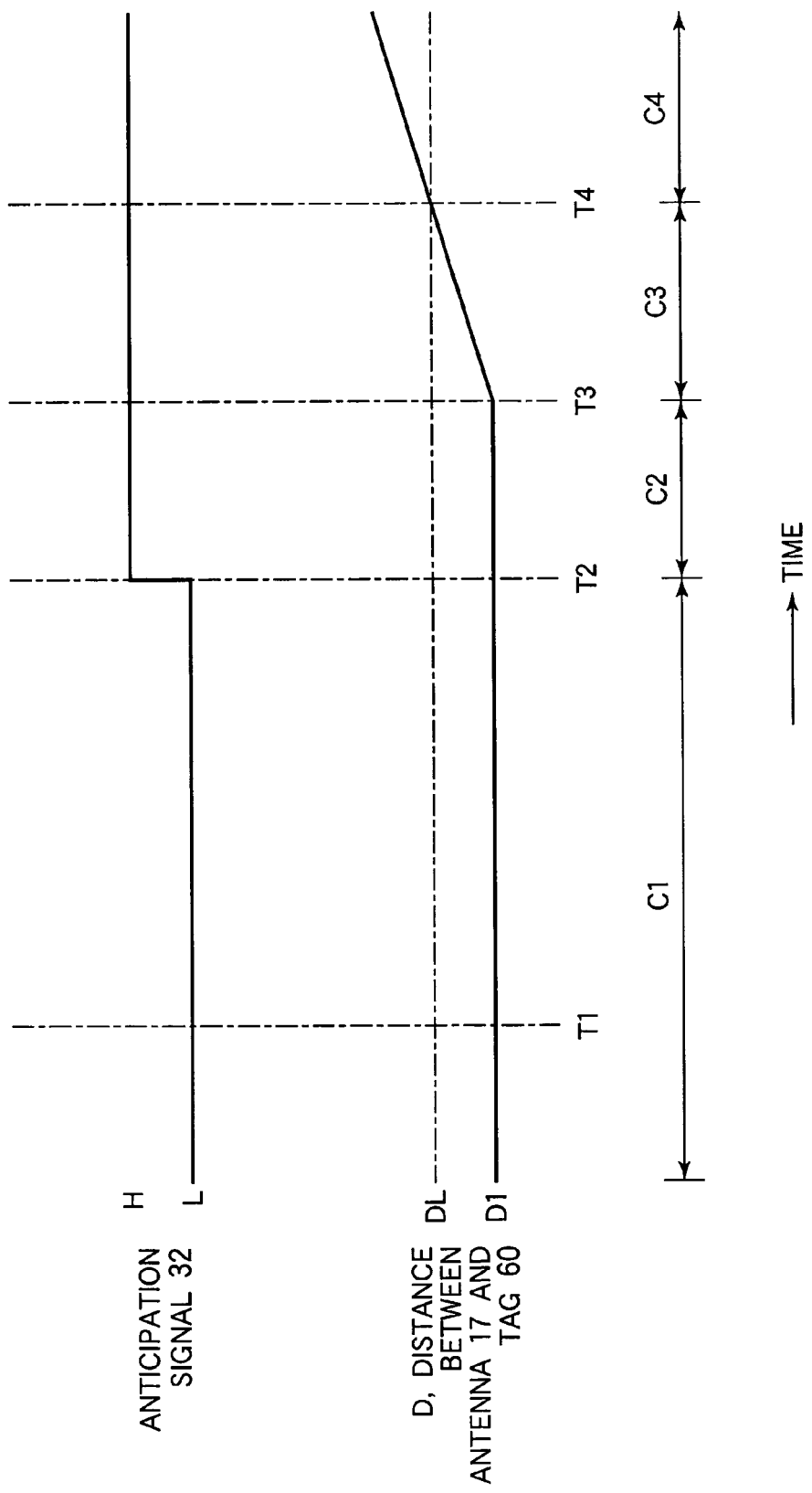

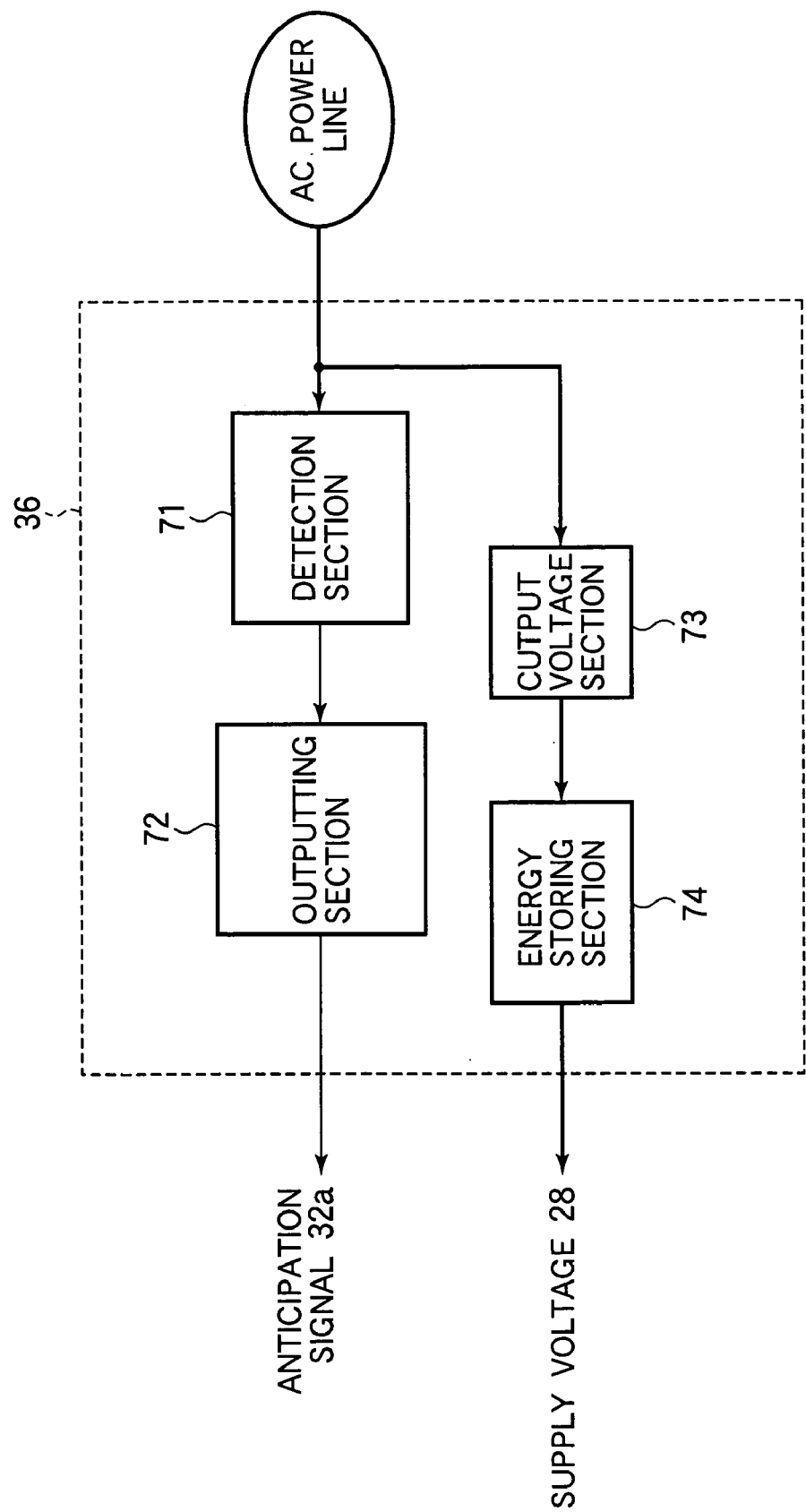

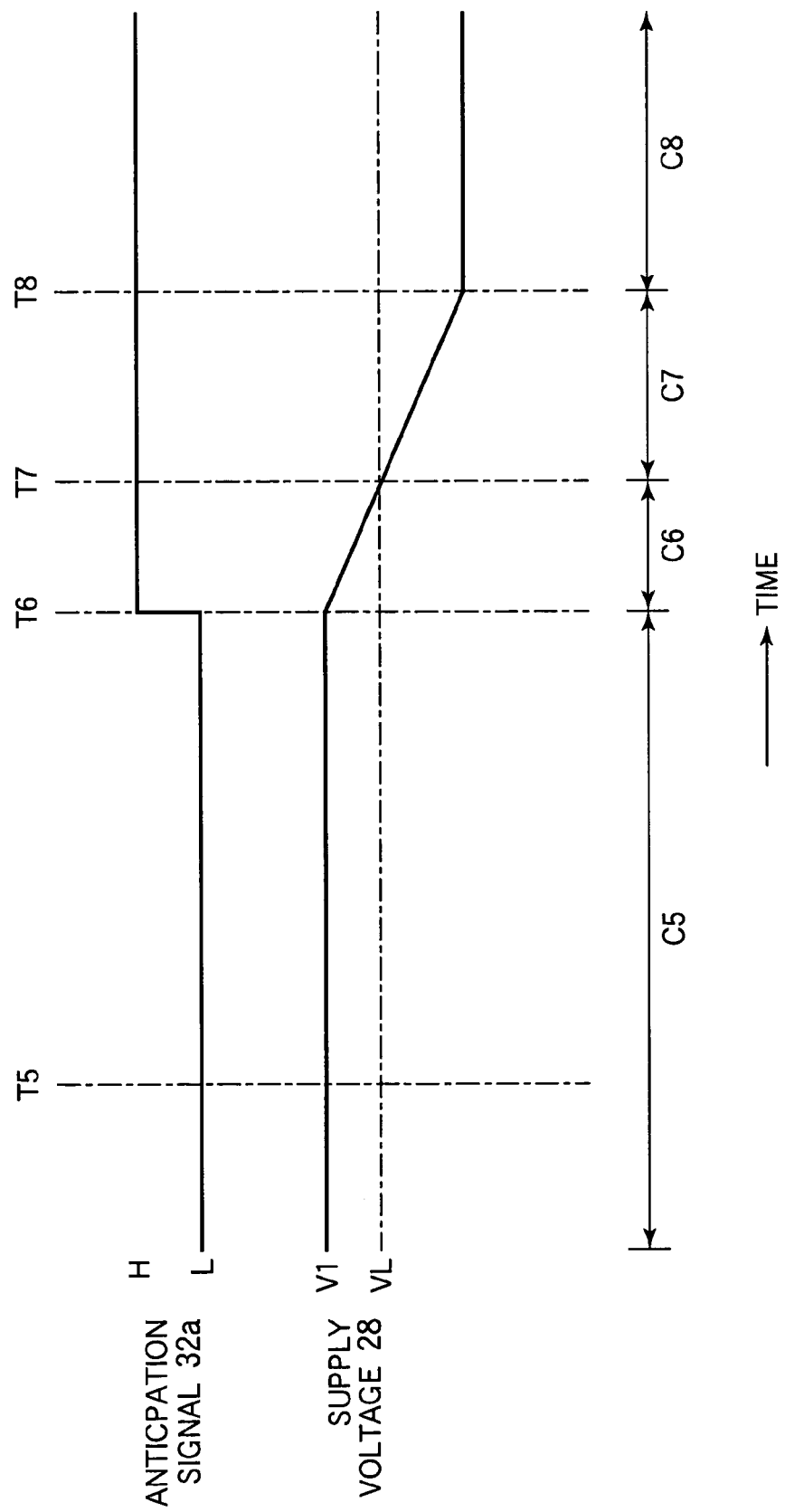

ELECTRONIC APPARATUS

BACKGROUND OF THE INVENTION

1. Field of the Invention

The present invention relates to an electronic apparatus incorporating a reader/writer unit with a sub unit. The sub unit is detachably mounted to the electronic apparatus, and includes a wireless tag into which data can be written. The reader/writer unit is capable of supplying electric power to the wireless tag and communicating with the wireless tag.

2. Description of the Related Art

A conventional electronic apparatus incorporates a wireless tag in the form of a non-contact type memory device and a reader/writer unit. The reader/writer unit generates an alternating magnetic field through which electric power is supplied to the wireless tag and data can be written into the wireless tag and read (transfer) from the wireless tag.

One way of increasing the speed in serial transfer of data to the wireless tag is to employ a multi-valued signal by changing the drive voltage or the turns ratio of coils that generates the alternating magnetic field.

Multi-valued signals may also be implemented by employing frequency-modulation or phase-modulation in which no error in reading data occurs on a receiving end even when data is transmitted at high rates and when the distance between the wireless tag and the reader/writer unit fluctuates.

A writable wireless tag usually employs a memory in the form of a non-volatile memory. When data is written into a non-volatile memory, the data at a specified write-address in the memory is first cleared and then new data is written into the address.

For a wireless tag, a non-volatile memory receives electric power through an alternating magnetic field. When data is being written into the nonvolatile memory, if the non-volatile memory fails to receive the electric power for some reason, there is often the case in which data fails to be written shortly after the specified address in the non-volatile memory has been cleared. This occurs, for example, when power failure occurs or when the wireless tag and the reader/writer unit come apart, so that they can no longer communicate with each other normally.

In order to prevent corruption of data due to the fact that the alternating magnetic field fails to be received during a data write operation and prior to clearing of the specified address, the data may be copied into another address located in the non-volatile memory, and a hash value produced by using a hash function of the original data may be written into still another address located in the non-volatile memory. When the data is read from the specified address, the hash value is also read and an operation is performed to determine whether the data has been corrupted. If data corruption is detected, the corrupted data is recovered by using the backup copy of the original data.

However, the aforementioned conventional methods require an extra memory capacity for storing the backup portion and the hash value, necessitating an increase in the storage capacity of the non-volatile memory in the wireless tag. Another problem with the aforementioned conventional method is that when the data is read from the specified address, the hash value is also read from another address to detect data corruption. Therefore, this method takes a long time to read the data.

SUMMARY OF THE INVENTION

The present invention was made in view of the aforementioned, drawbacks of the conventional method.

An object of the invention is to provide an electronic apparatus capable of minimizing the increase in the capacity of a non-volatile memory provided in a wireless tag and of minimizing the increase in the time required for reading data.

An electronic apparatus includes an accommodating section, a reader-and-writer unit, and an anticipation signal generator. The sub unit includes a wireless tag therein and is detachably attached to the accommodating section to which a sub unit is detachably attached. The reader-and-writer unit is housed in the accommodating section. When the sub unit is positioned in place in the accommodating section, the reader-and-writer unit communicates with the wireless tag to read data from the wireless tag and write data into the wireless tag. When communication between the wireless tag and the reader-and-writer unit is anticipated to fail, the anticipation signal generator provides an anticipation signal to the reader-and-writer unit. The reader-and-writer unit is prevented from communicating with the wireless tag in accordance with the anticipation signal.

The electronic apparatus may further include a mechanism. The mechanism either locks the reader-and-writer unit and the wireless tag to each other at a position at which the reader-and-writer unit communicates with the wireless tag normally or unlocks the reader-and-writer unit and the wireless tag from each other. The anticipation signal generator includes a detection section. The detection section detects when the mechanism will unlock the reader-and-writer unit and the wireless tag from each other. When a distance between the reader-and-writer unit and the wireless tag is longer than a prescribed value, the communication between the wireless tag and the reader-and-writer unit fails.

The electronic apparatus may further include a mechanism. The mechanism either locks the reader-and-writer unit and the wireless tag to each other at a position at which the reader-and-writer unit communicates with the wireless tag normally or unlocks the reader-and-writer unit and the wireless tag from each other;

wherein the anticipation signal generator includes a detection section that detects when the mechanism is brought into a prescribed state;

wherein when the mechanism is at a prescribed state, the communication between the wireless tag and the reader-and-writer unit is anticipated to fail.

The mechanism includes a first engagement portion and a second engagement. When said mechanism locks said first engagement portion to the second engagement portion, the first engagement portion and the second engagement portion remain engaged with each other within a first stroke of movement of said mechanism. The prescribed state is such that the locking mechanism is within a second stroke of movement of said locking mechanism, the second section being within the first stroke.

The detection section may be an electrical switch.

The electronic apparatus further includes a lid that opens and closes the accommodating section and to which the reader-and-writer unit is mounted. The position at which the reader-and-writer unit communicates with the wireless tag normally includes a position at which the lid has just closed closes the accommodating section.

The electronic apparatus further includes a lid that opens and closes the accommodating section and to which the reader-and-writer unit is mounted. The position at which the reader-and-writer unit communicates with the wireless tag normally includes a position at which the lid closes the accommodating section.

The electronic apparatus further includes a lid that opens and closes the accommodating section and to which the reader-and-writer unit is mounted. The position at which the reader-and-writer unit communicates with the wireless tag normally includes a position at which the lid closes the accommodating section.

The mechanism locks the lid to close the accommodating section.

The electronic apparatus further includes an image forming section that forms an image on a recording medium and the sub unit is a part of the image forming section.

The sub unit includes a toner cartridge that is detachably attached to the sub unit, and the wireless tag is mounted to the toner cartridge.

The electronic apparatus further includes a power supplying section and an energy storing section. The power supplying section supplies electric power to the reader-and-writer unit. The energy storing section supplies electric power to the reader-and-writer unit for a prescribed length of time after the power supply fails. When supply of electric power to the reader-and-writer unit fails, the communication between the wireless tag and the reader-and-writer unit fails. The anticipation signal generator includes a detection section that detects when supply of electric power to the power supplying section fails.

The electronic apparatus further includes an image forming section that forms an image on a recording medium and the sub unit is a part of the image forming section.

The sub unit includes a toner cartridge that is detachably attached to the sub unit, and the wireless tag is mounted to the toner cartridge.

An electronic apparatus includes a data storing unit, a data writing section, a lid, a mechanism that locks and unlocks the lid, a detection section. The data storing unit is detachably attachable. When the data storing unit has been attached in position, the data writing section writes data into the data storing unit. The lid is movable to open and close. When an interior of the apparatus is to be accessed, the lid is opened. The detection section outputs a detection signal, the detection signal anticipating that the mechanism unlocks the lid. Writing data into the data storing unit is halted in accordance with the detection signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 4 is an enlarged fragmentary view of a locking mechanism when it is at a locked position;

FIG. 5A illustrates the locking mechanism when a lock lever has been completely locked;

FIG. 5B illustrates first and second portions of the electronic apparatus when the lock lever is at the position in FIG. 5A;

FIG. 6A illustrates the lock lever when the lock lever is rotated from the locked position somewhat in an unlocking direction but still remains locked;

FIG. 6B illustrates the first and second portions when the lock lever is at the position in FIG. 6A;

FIG. 7A illustrates when the lock lever is further rotated in the unlocking direction to its unlocked position;

FIG. 7B illustrates the first and second portions when the lock lever is at the unlocked position in FIG. 7A;

FIG. 8 illustrates timings of an anticipation signal when the distances between the wireless tags and antennas are changed;

FIG. 11 is a schematic block diagram illustrating the configuration of a power supply section for an electronic apparatus according to a second embodiment; and FIG. 12 is a timing chart illustrating the anticipation signal and the change in supply voltage.

DESCRIPTION OF THE INVENTION

First Embodiment

Figure 1:
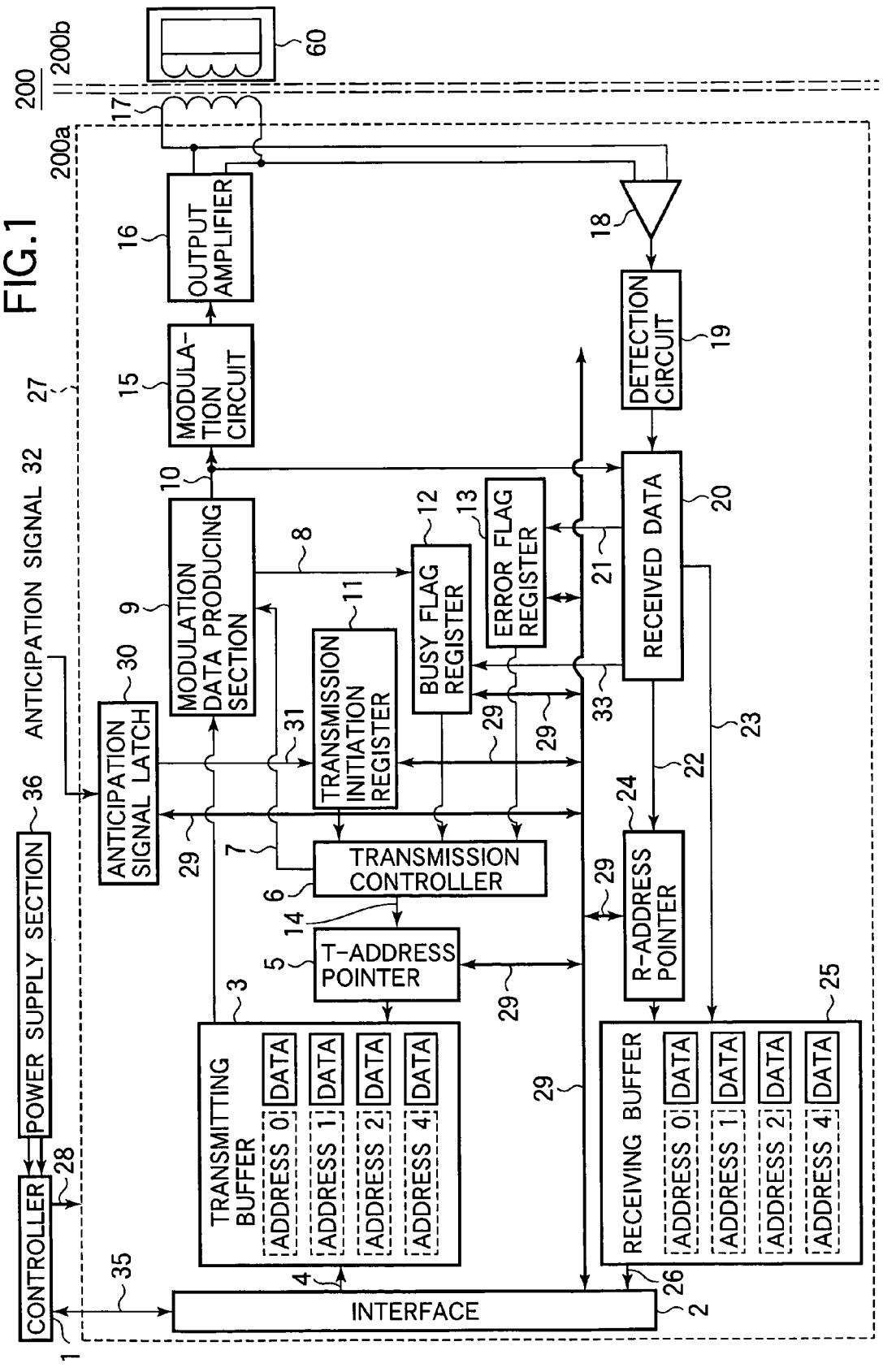
FIG. 1 is a schematic block diagram illustrating an electronic apparatus according to a first embodiment.

FIG. 1 is a schematic block diagram illustrating an electronic apparatus according to a first embodiment. Referring to FIG. 1, an electronic apparatus 200 is comprised of a first portion 200b and a second portion 200a separate from the first portion 200b. The first portion 200b and second portion 200a are coupled via a locking mechanism that maintains the first and second portions coupled with each other when the electronic apparatus is operating. The first portion 200b receives a sub unit that is detachably attached thereto. The sub unit includes a writable wireless tag 60 therein. The second portion 200a incorporates at least the reader/writer unit 27 and the power supply 36. The locking mechanism will be described later with reference to FIG. 4.

An antenna 17 generates an alternating magnetic field for supplying electric power to the wireless tag 60, and radiates and receives radio signals. A reader/writer unit 27 is constructed integral with the antenna 17 and feeds a voltage and signals to the antenna 17. A controller 1 supplies a supply voltage 28 to the reader/writer unit 27 and controls the reader/writer unit 27 by using, for example, control commands. A power supply 36 supplies the supply voltage 28 to the reader/writer unit 27 through the controller 1. A section for generating an anticipation signal 32 will be described later with reference to FIG. 4.

The reader/writer unit 27 communicates with the controller 1 using a reader/writer communication signal 135. The reader/writer unit 27 receives the supply voltage 28 from the connection 1.

Through an interface 2, the controller 1 writes data into and reads data from the respective registers and buffers incorporated in the reader/writer unit 27. The antenna 17 is electromagnetically coupled with the wireless tag 60.

In the event that failure of communication of data between the readier/writer unit 27 and the wireless tag 60 is anticipated, an anticipation signal generator, which will be described later with reference to FIG. 4, detects such an event to output the anticipation signal 32.

When the reader/writer unit 27 receives the anticipation signal 32, the reader/writer unit 27 immediately stops the subsequent transmission of data to the wireless tag 60.

For example, when the locking mechanism unlocks the first portion 200b and second portion 200a so that they come apart, the anticipation signal generator generates the anticipation signal.

The transmitting buffer 3 receives data from the controller 1 via the interface 2, and stores the data as buffer data until the data is transmitted to the wireless tag 60.

A T-address pointer 5 receives a register read/write signal 29 from the controller 1 and a buffer address increment signal 14 from a transmission controller 6, thereby reading data from and writing data into the specified address in the transmitting buffer 3. For example, when the T-address pointer 5 outputs a signal to specify the address of the transmitting buffer 3, the data at the specified address is outputted to a modulation data producing section 9.

The contents in a transmission initiation register 11, a BUSY FLAG register 12, and an error FLAG register 13 are input into the transmission controller 6. The transmission controller 6 then outputs the buffer address increment signal 14 to the T-address pointer 5 while also outputting a trigger 7 to the modulation data producing section 9.

The modulation data producing section 9 produces modulation data from the data received from the transmitting buffer 3, and outputs the modulation data 10 to a modulation circuit 15. The modulation data producing section 9 also produces a BUSY FLAG setting signal 8 and outputs the BUSY FLAG setting signal 8 to a BUSY FLAG register 12. Upon receiving the trigger 7 (at timing 7a in FIG. 9), the modulation data producing section 9 converts the transmission data received from the transmitting buffer 3 into a transmission format. The transmission data is outputted as modulation data 10 in a binary form to the modulation circuit 15 and a receiving data determining section 20.

The transmission initiation register 11 can be accessed using the register read/write signal 29, so that the transmission initiation register 11 outputs its content to the transmission controller 6. When a reset signal 31 is inputted, the transmission initiation register 11 is reset.

The BUSY FLAG register 12 can be accessed by the controller 1 using the register read/write signal 29. The BUSY FLAG register 12 is set by the BUSY FLAG setting signal 8 to output its FLAG value to the transmission controller 6, and is reset by a BUSY FLAG resetting signal 33 (at timing 33a in FIG. 9).

The modulation circuit 15 performs ASK (amplitude shift keying)-modulation in which the modulation data 10 received from the modulation data producing section 9 is amplitude-modulated onto a carrier wave so that the modulated output is the altering of the amplitude of the carrier wave in accordance with the modulation data 10. The modulation circuit 15 then outputs the ASK-modulated data to an output amplifier 16.

The output amplifier 16 amplifies the ASK-modulated data, and the antenna 17 radiates the output of the output amplifier 16.

A receiving amplifier 18 receives the signal that appears across the terminals of the antenna 17. The receiving amplifier 18 amplifies the signal, and outputs the amplified signal to a detection circuit 19. When a load switch 51 (FIG. 2), which will be described later, is driven on and off, the signal appearing across the terminals of the antenna 17 changes. The detection circuit 19 operates to detect the change in the signal across the terminals of the antenna 17 due to the on and off operations of the switch 51. That is, the detection circuit 19 demodulates the load switching signal into a binary signal, and outputs the binary signal to the receiving data determining section 20.

The receiving data determining section 20 receives the modulation data 10 and the demodulated load switching signal. The receiving data determining section 20 outputs a received data 23, a receiving buffer increment signal 22, the BUSY FLAG resetting signal 33, and an error FLAG setting signal 21. The data in the receiving data determining section 20 is addressed by an R-address pointer 24 and is outputted as received data 23 to a receiving buffer 25.

The controller 1 can access the R-address pointer 24 by using the register read/write signal 29, which in turn addresses the receiving buffer 25. The R-address pointer 24 also receives a receiving buffer address increment signal 22 from the receiving data determining section 20.

The receiving buffer 25 stores the data received from the wireless tag 60. The data in the receiving buffer 25 is read as receiving buffer data 26, and is outputted to the controller 1 through the interface 2.

An anticipation signal latch 30 latches the anticipation signal 32 received in the reader/writer unit 27 from an external device. The controller 1 accesses the anticipation signal latch 30 by using the register read/write signal 29 to output the reset signal 31 to the transmission initiation register 11.

The anticipation signal 32 is a signal that anticipates that the first and second portions 200b and 200a will come apart soon. More specifically, the anticipation signal 32 anticipates that the wireless tag 60 mounted on the first portion 200b will move out of magnetically coupled engagement with the antenna 17 mounted on the second portion 200a, supply of electric power to the wireless tag 60 will be stopped, and data communication will fail soon.

Figure 2:
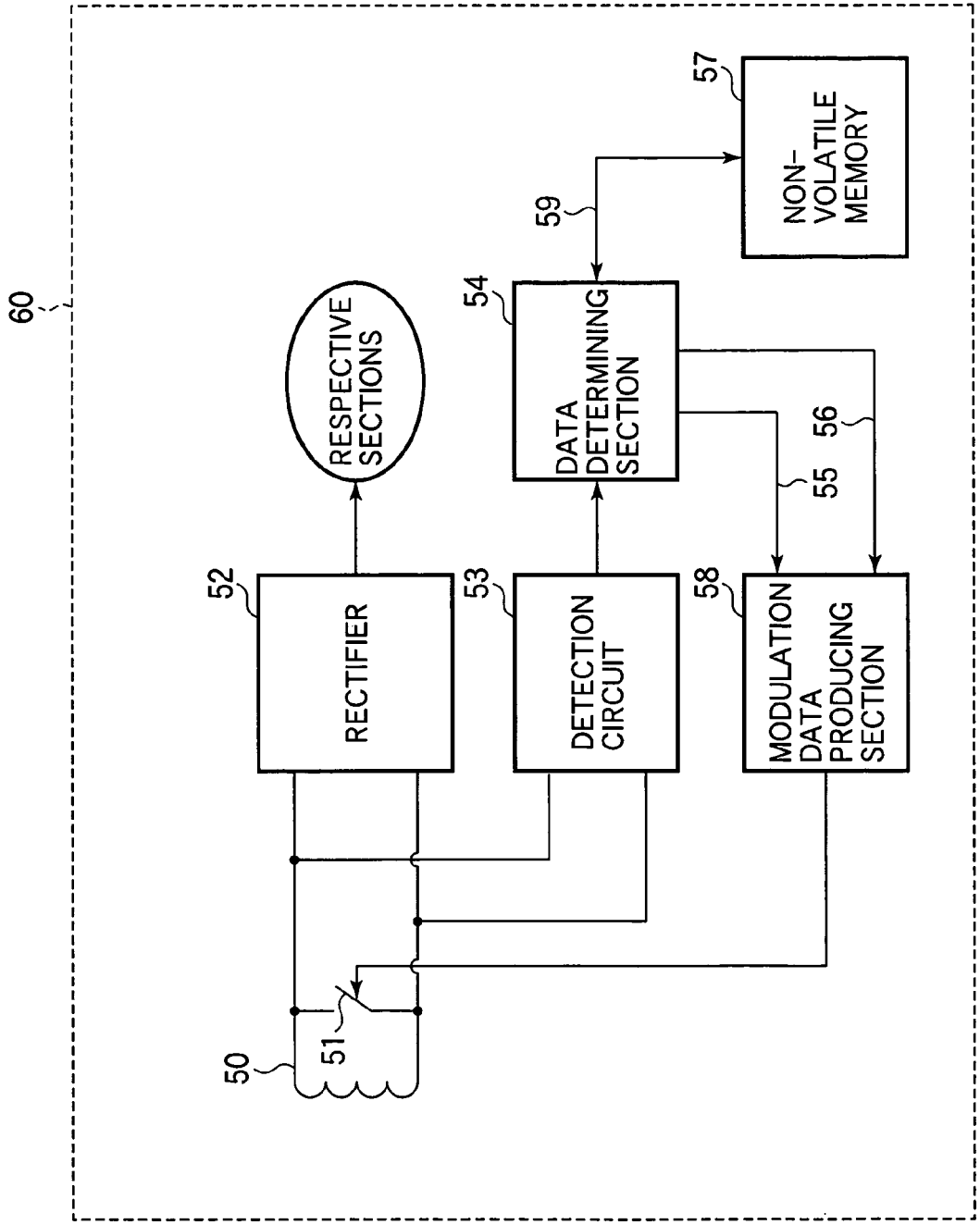
FIG. 2 is a block diagram illustrating the configuration of a wireless tag.

FIG. 2 is a block diagram illustrating the configuration of the wireless tag 60. A load switch 51, a rectifier 52, and a detection circuit 53 are connected in parallel with an antenna 50.

The antenna 50 magnetically couples with the alternating magnetic field generated by the antenna 17 to induce an alternating current as well as to receive the ASK-modulated data from the reader/writer unit 27

The rectifier 52 rectifies the alternating current generated by the antenna 50 to produce necessary electric power for the respective sections in the wireless tag 60.

The detection circuit 53 demodulates the ASK-modulated data into a binary signal and outputs the binary signal to a receiving data determining section 54.

The receiving data determining section 54 extracts data from the signal demodulated in the detection circuit 53, decodes instructions contained in the demodulated signal, and detects a carrier signal. The demodulated signal contains various instructions to the wireless tag 60 such as writing data into and reading data from the non-volatile memory 57. The demodulated signal also contains instructions to read identifications stored in the wireless tag 60 and to erase the data in the non-volatile memory 57. Then, the wireless tag 60 performs various operations based on the decoded instructions, thereby outputting a carrier detection signal 55 and a response code 56 responding to the received data instruction. The response code 56 is outputted to a modulation data producing section 58. If the decoded result indicates a data-read/data-write operation, the receiving data determining section 54 accesses a non-volatile memory 57 by using a non-volatile memory access signal 59.

The non-volatile memory access signal 59 controls the non-volatile memory 57 to read data from and write data into the non-volatile memory 57. The data read from and written into the non-volatile memory 57 are also outputted to the receiving data determining section S4 by using the non-volatile memory access signal 59.

Upon receiving the carrier detection signal 55 and a response code 56, the modulation data producing section 58 converts the response code 56 into a transmission format, the response code 56 responding to the instructions contained in the demodulated signal. The modulation data producing section 58 then controls the load switch 51 to become on and off in accordance with the response code 56, thereby transmitting the response code 56 to the reader/writer unit 27.

Figure 3:
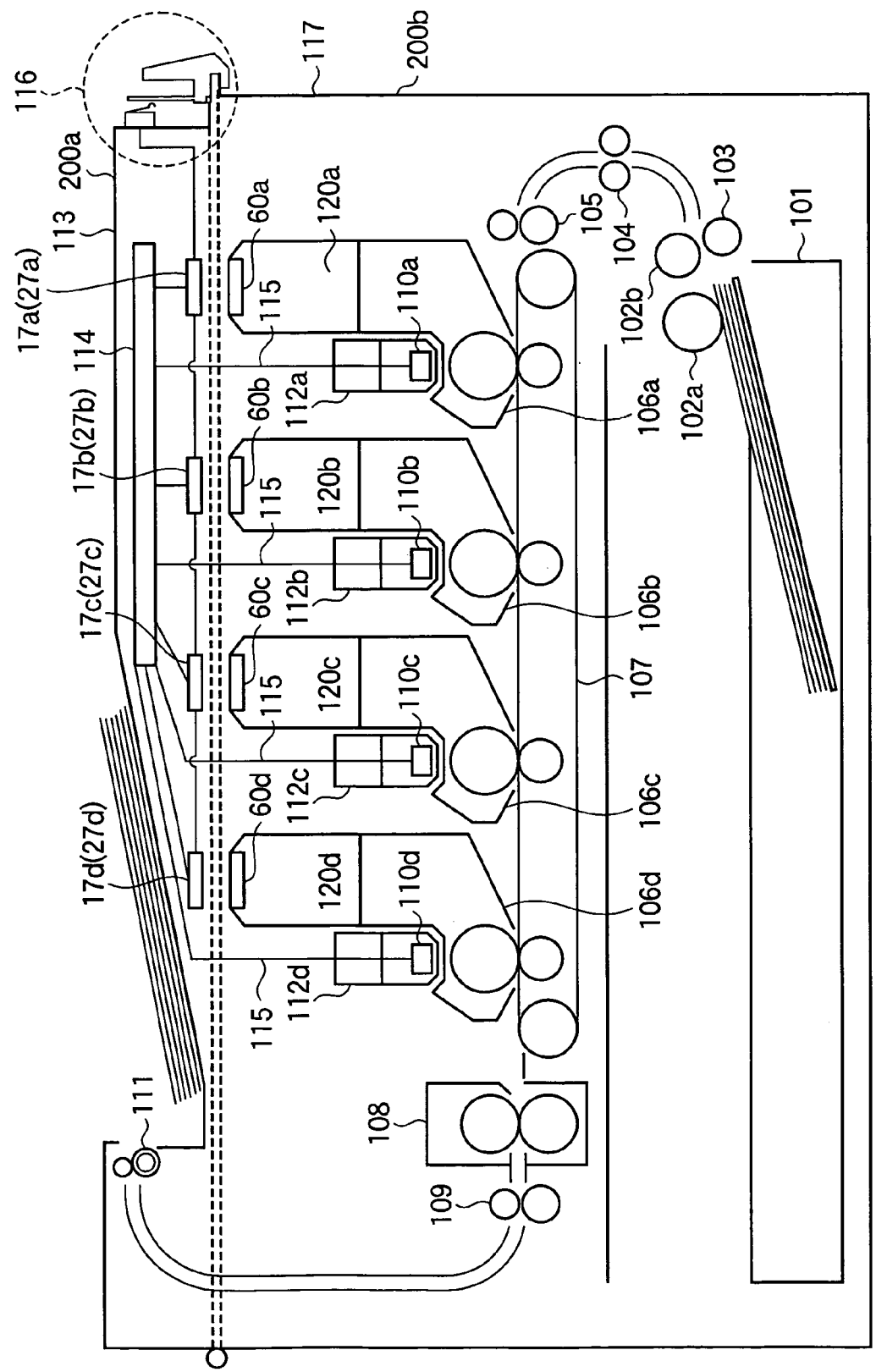
FIG. 3 is a schematic view illustrating the configuration of the electronic apparatus that takes the form of an electrophotographic color printing apparatus.

FIG. 3 is a schematic view illustrating the configuration of the electronic apparatus 200 that takes the form of an electrophotographic color printing apparatus. A paper cassette 110 is at a lower portion of the apparatus, and holds a stack of recording medium therein. A paper feeding mechanism includes a feed roller 102a, feed roller 102b, and separator roller 103. The paper feeding mechanism separates the top page of the stack of recording medium to feed the recording medium on a sheet-by-sheet basis toward a transport roller 104.

When the recording medium reaches a transport roller 105, the transport roller 105 causes the recording medium to further advance onto a transport belt 107. The recording medium advances through a plurality of image forming sections 106a-106d in this order, so that the images of the respective colors are transferred onto the recording medium. Then, the recording medium further advances to a fixing unit 108 where the images of the respective colors are fused into a full color permanent image. The recording medium is then discharged from the fixing unit 108 to a transport roller 109, which further advances the recording medium toward a discharge roller 111. The discharge roller 111 discharges the recording medium onto a stacker.

LED units 110a-110d are provided at the image forming sections 106a-106d, respectively, and form electrostatic latent images for the respective colors. Holders 112a-112d hold the LED units 110a-110d, respectively, in such a way that the LED units 110a-110d are positioned relative to the image forming sections 106a-106d in an abutting relation. The holders 112a-112d are supported on the second portion 200a that is adapted to open and close with respect to the image forming apparatus. Thus, when the second portion 200a (a frame 113) is opened and closed, the LED units 110a-110d move relative to the image forming apparatus.

The LED units 110a-110d are electrically connected to a controller 114 of the image forming apparatus via signal cables 115. Toner cartridges 120a-120d are mounted on the image forming sections 106a-106d, respectively, and supply toners of corresponding colors. Each image forming section includes a photo conductive drum on which an electrostatic latent image is formed and a developing unit that develops the electrostatic latent image.

Wireless tags 60a-60d are mounted on the toner cartridges 120a-120d, respectively. The antennas 17a-17d of the read/writer unit 27 are mounted on the second portion 200a so that the antennas 17a-17d face the corresponding wireless tags 60a-60d, respectively. A locking mechanism 116 is provided on the second portion 200a so that when the second portion 200a is closed, the second portion 200a is locked to a base frame 117.

FIG. 4 is an enlarged fragmentary view of the locking mechanism 116 when it is at a locked position.

The second portion 200a supports a lock lever shaft 119 and a micro switch 130 fixedly mounted thereto. The lock lever shaft 119 extends through a lock lever 118 such that the lock lever 118 can rotate about the lock lever shaft 119 in an unlocking direction in which the second portion 200a is unlocked and in a locking direction in which the second portion 200a is locked. When the second portion 200a is at the locked position, a locking portion 121 of the lock lever 118 is operated to catch a fixing portion 117a of the base frame 117 so that the second portion 200a is locked to the image forming apparatus. When the lock lever 118 is still at its locked position, a switch lever 130a of a micro switch 130 has not been depressed yet.

Rotating the lock lever 118 in the unlocking direction causes a pressing portion 122 of the lock lever 118 to push down the switch lever 130a of the micro switch 130. At this moment, the second portion 200a has not been unlocked yet. Rotating the lock lever 118 further in the unlocking direction causes the locking portion 121 to move out of engagement with the fixing portion 117a.

The micro switch 130 detects the initial movement of the second portion 200a before the cover is completely opened, and sends a detection signal (i.e., the anticipation signal 32) to the reader/writer unit 27, the detection signal indicating that each of the wireless tags 60a-60d and a corresponding one of the antennas 17a-17d will come apart soon.

FIG. 5A illustrates the locking mechanism 116 when the lock lever 118 has been completely locked. The micro switch 130 outputs the anticipation signal 32, which is an "L" (OFF). FIG. 5B illustrates the first and second portions 200b and 200a when the lock lever 118 is at the position in FIG. 5A, i.e., when the first and second portions 200b and 200a are locked to each other.

Referring to FIG. 5B, the wireless tags 60a-60d are a distance D1 apart from the antennas 17a-17d. The distance D1 is such that communication can be reliably accomplished between the wireless tags 60a-60d and the antennas 17a-17d.

FIG. 6A illustrates the lock lever 118 when the lock lever 118 is rotated from the locked position somewhat in the unlocking direction but still remains locked. FIG. 6B illustrates the first and second portions 200b and 200a when the lock lever 118 is at the position in FIG. 6A.

Referring to FIG. 6A, while the lock lever 118 is rotated somewhat in the unlocking direction so that the pressing portion 22 depresses the switch lever 130a of the micro switch 130, the first and second portions 200b and 200a still remain locked to each other. Because the switch lever 130a has been depressed, the micro switch 130 outputs the anticipation signal 32, which is an "H" (ON).

Referring to FIG. 6B, because the first and second portions 200b and 200a are still locked to each other, the distance between the wireless tags 60a-60d and the antennas 17a-17d is D1. Thus, communication can be accomplished between the wireless tags 60a-60d and the antennas 17a-17d.

FIG. 7A illustrates when the lock lever 118 is further rotated in the unlocking direction to its unlocked position. FIG. 7B illustrates the first and second portions 200b and 200a when the lock lever 118 is at the unlocked position in FIG. 7A.

Referring to FIG. 7A, the lock lever 118 is rotated even further in the unlocking direction so that the first and second portions 200*b* and 200*a* are no longer locked to each other. Thus, the pressing portion 122 has depressed the switch lever 130*a* of the micro switch 130 and therefore the first and second portions 200*b* and 200*a* are unlocked from each other. Because the switch lever 130*a* has been depressed, the micro switch 130 outputs the anticipation signal 32, which is an "H" (ON).

Referring to FIG. 7B, the first and second portions 200*b* and 200*a* are unlocked from each other. The wireless tags 60*a*-60*d* are distances D2 to D5 apart from the antennas 17*a*-17*d*, respectively. The distances D2 to D5 are greater than the distance D1 such that communication can no longer be accomplished between the wireless tags 60*a*-60*d* and the antennas 17*a*-17*d*. Because the first and second portions 200*b* and 200*a* are hinged together, the distances D1 to D5 are related such that D2>D3>D4>D5>D1.

FIG. 8 illustrates the timings of the anticipation signal 32 when the distances between the wireless tags 60*a*-60*d* and the antennas 17*a*-17*d* are changed. For simplicity only the operations of one of the wireless tags and one of the antennas will be described, it being understood that the other wireless tags and antennas may work in a similar fashion. During a period C1, the anticipation signal 32 is at an "L" at timing T1 (e.g., FIG. 5), and the distances between wireless tags 60*a*-60*d* and the antennas 17*a*-17*d* are D1. The distance D1 is shorter than a critical distance DL beyond which communication between the wireless tags 60*a*-60*d* and the antennas 17*a*-17*d* is absolutely impossible, respectively.

The anticipation signal 32 becomes an "H" at timing T2 (e.g., FIG. 6). During a period C2 (from timing T2 to timing T3), the first and second portions 200*b* and 200*a* remain locked and are the distance D1 apart.

The first and second portions 200*b* and 200*a* move out of locked engagement with each other at timing T3. At this moment, the anticipation signal 32 is still an "H." During a period C3, the first and second portions 200*b* and 200*a* are locked, and the distance between the first and second portions 200*b* and 200*a* increases gradually. It is to be noted that the distance D1 is shorter than the critical distance DL during the period C3.

In other words, when the pressing portion 122 depresses the switch lever 130*a* at the timing T2, the anticipation signal 32 goes high (an "H"). During the period C2, the first and second portions 200 b and 200*a* are still locked, so that the distance between the wireless tag and the antenna is unchanged. During C3, the distance gradually increases but is still shorter than the critical distance DL and the data stored in the receiving buffer may be stored into a non-volatile memory, not shown. However, in the first embodiment, the data is not transmitted from the transmitting buffer 3 during C3. If data is transmitted during the periods C2 and C3 just as in the conventional art, the distance between the wireless tags 60 and the antenna 17 may have become longer than the critical distance DL by the time the responsive data is received. This causes data corruption.

The distance will become equal to or longer than the critical distance DL at timing T4. During a period C4, the data can no longer be written. Thus, if the period C4 is entered during transmission of data, the data that is written at that moment is corrupted.

Figure 9:
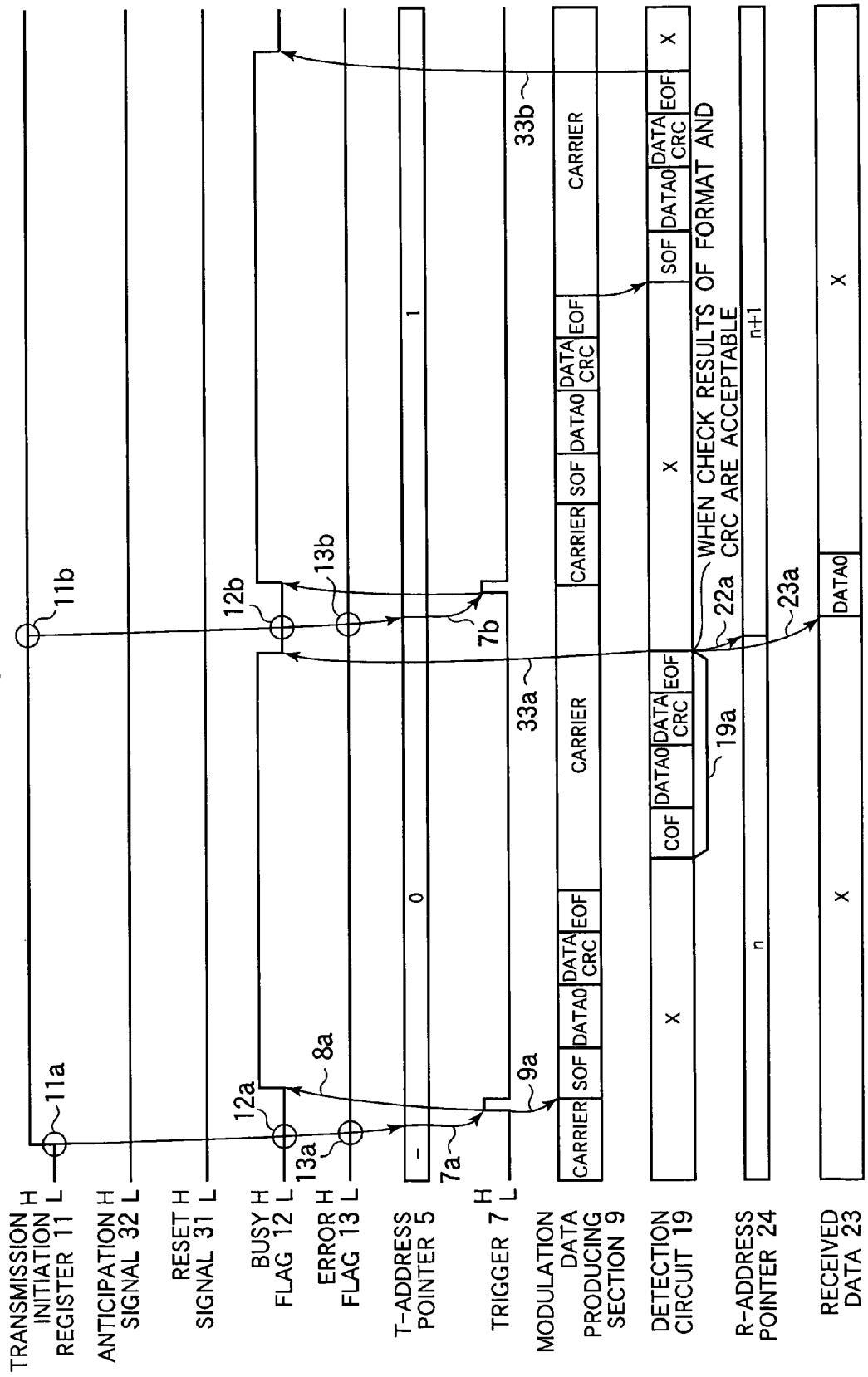
FIG. 9 illustrates the operation of respective sections in the electronic apparatus and timings of various signals when a reader/writer unit is at a normal state.

FIG. 9 illustrates the operation of the respective sections and timings of various signals when the reader/writer unit 27 is at the normal state (i.e., when the locking mechanism 116 is not operated by the user). References 7*a*, 7*b*, 9*a*, 11*a*, 11*b*, 12*a*, 12*b*, 13*a*, 33*a*, 33*b*, 19*a*, 22*a*, and 23*a* denote conditions of the respective signals in FIG. 1.

The timings in FIG. 9 are the same as those when the data in the transmitting buffer 3 is transmitted to the wireless tag 60 and when data is received from the wireless tag 60.

The controller 1 writes the data into the transmitting buffer 3 through the interface 2. The address for addressing the transmitting buffer 3 is written into the T-address pointer 5. Assume that the buffer data 4 has been previously written into the transmitting buffer 3.

FIG. 9 illustrates the normal operation in which the user does not operate locking mechanism 116. The anticipation signal 32 remains an "L" from when the data in the transmitting buffer 3 is transmitted to the wireless tag 60 until the receiving buffer 25 stores data received from the wireless tag 60, so that the anticipation signal latch 30 does not detect the anticipation signal 32.

The controller 1 sets the transmission initiation register 11 from an "L" to an "H."

Then, when the transmission initiation register 11 is at an "H" (11*a* in FIG. 9), the BUSY FLAG register 12 is an "L" (12*a* in FIG. 9), and the error FLAG register 13 is an "L" (13*a* in FIG. 9), the transmission controller 6 sets the T-address pointer 5 to "OH" to generate a data producing trigger 7 (7*a* in FIG. 9).

In response to the data producing trigger 7, the modulation data producing section 9 produces the data, received from the transmitting buffer 3, into a transmission format. The data in the transmission format is outputted as modulation data 10 to the modulation circuit 15 and the receiving data determining section 20. The modulation data producing section 9 also outputs the BUSY FLAG setting signal 8 to the BUSY FLAG register 12. The modulation data 10 contains SOF (Start of Frame)+data+DATA CRC+EOF (End of Frame), and a carrier.

The modulation circuit 15 performs ASK-modulation (amplitude shift keying)-modulation in which the modulation data 10 received from the modulation data producing section 9 is amplitude-modulated onto a carrier wave so that the modulated output is the altering of the amplitude of the carrier wave in accordance with the modulation data 10. The output amplifier 16 amplifies the ASK-modulated signal, which is then radiated from the antenna 17.

In the wireless tag 60, the alternating magnetic field produced by the antenna 17 couples the antenna 50 to induce a voltage across the antenna 50. The rectifier 52 rectifies the voltage inducted across the antenna 50 to supply electric power to the respective sections within the wireless tag 60. The detection circuit 53 demodulates the ASK-modulated signal, received together with the alternating magnetic field, into a binary signal, and then outputs the demodulated signal to the receiving data determining section 54.

The receiving data determining section 54 extracts the data from the signal demodulated in the detection circuit 53, then decodes the instructions contained in the demodulated signal, and detects the carrier signal, and finally outputs the response code 56 and the carrier detection signal 55 to the modulation data producing section 58. If the instruction contained in the demodulated signal describes a read/write operation, the receiving data determining section 54 accesses the non-volatile memory 57 by way of the non-volatile memory access signal 59.

The non-volatile memory 57 either stores data or outputs data in accordance with the non-volatile memory access signal 59. The results of reading data from and writing data into the non-volatile memory 57 are outputted to the receiving data determining section 54 by way of the non-volatile memory access signal 59.

Upon receiving the carrier detection signal 55 and the response code 56, the modulation data producing section 58 converts the response code 56 into the transmission format, i.e., SOF (Start of Frame)+response data+DATA CRC+EOF (End of Frame). The response code 56 responds to the instruction contained in the demodulated signal. The modulation data producing section 58 causes the load switch 51 to turn ON and OFF in accordance with the response code 56, thereby transmitting the data to the reader/writer unit 27.

The receiving amplifier 18 on the reader/writer unit 27 amplifies the signal across the antenna 17, and then outputs the amplified signal to the detection circuit 19. The detection circuit 19 demodulates the load switching signal in the wireless tag 60 into a binary signal, and then outputs the binary signal to the receiving data determining section 20 (19a in FIG. 9).

The receiving data determining section 20 checks the data format (frame) and CRC of the binary signal (response data from the wireless tag 60) received from the detection circuit 19. If the check results are acceptable, then the receiving data determining section 20 does not output the error FLAG setting signal 21 to the error FLAG register 13 but outputs the BUSY FLAG resetting signal 33 (33a in FIG. 9) to the BUSY FLAG register 12, and the received data 23 (i.e., the response data received from the wireless tag 60) together with the receiving buffer address increment 22 to the receiving buffer 25.

Once the BUSY FLAG register 12 is reset, the transmission controller 6 receives an "H" (11b in FIG. 9) from the transmission initiation register 11, an "L" (12b in FIG. 9) from the BUSY FLAG register 12, and an "L" (13b in FIG. 9) from the error FLAG register 13, thereby incrementing the T-address pointer 5 (14b in FIG. 9) to generate the trigger 7 (7b in FIG. 9).

The aforementioned control is performed for transmitting and receiving the subsequent data. That is, the data previously written into the transmitting buffer 3 is transmitted to the wireless tag 60, and the response data, received from the wireless tag 60, is written into the receiving buffer 25.

Figure 10:
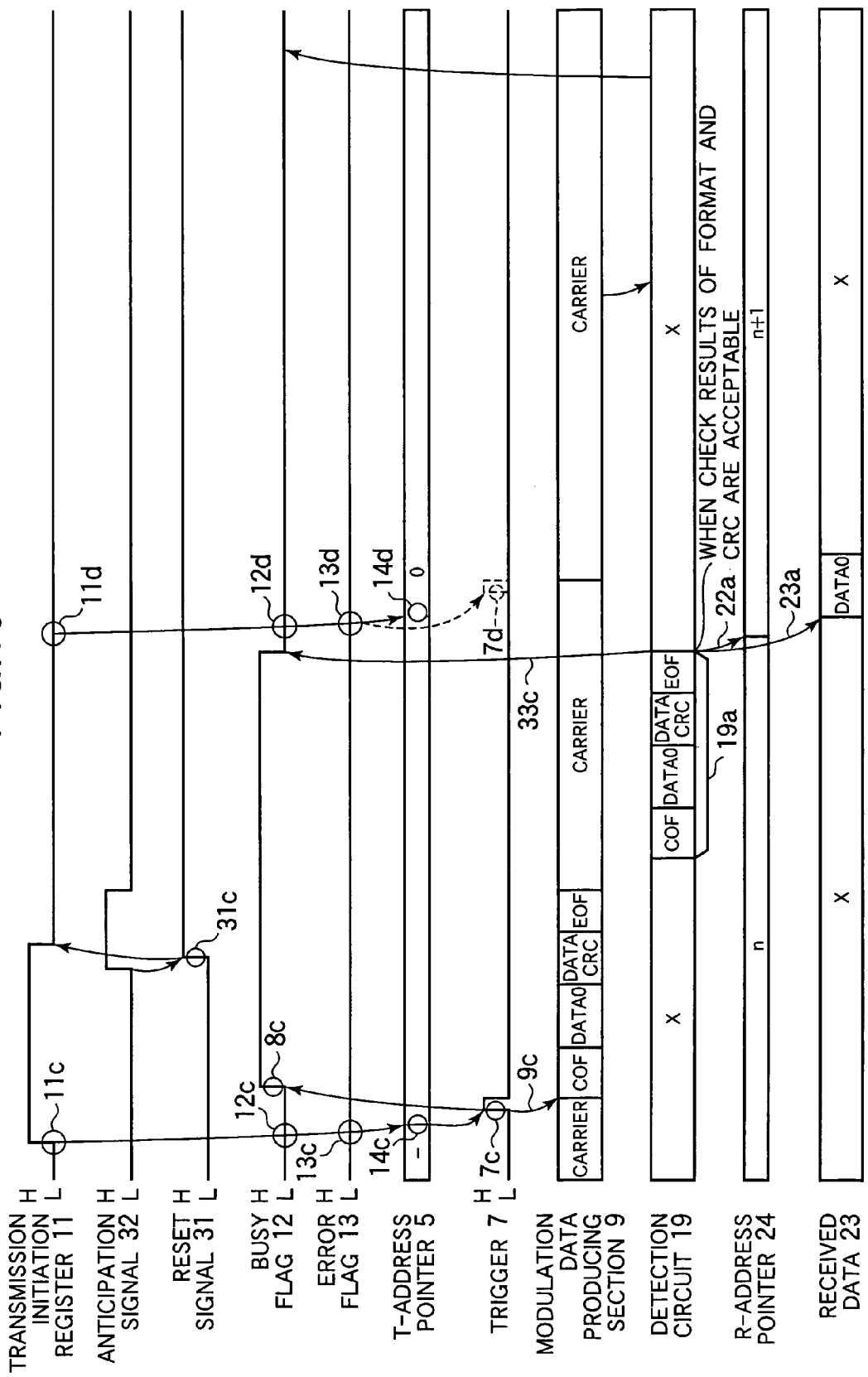
FIG. 10 is a timing chart illustrating the operations and signal timings of the respective sections in the reader/writer unit from when data in a transmitting buffer is transmitted to the wireless tag until a receiving buffer receives the data from the wireless tag.

FIG. 10 is a timing chart illustrating the operations and signal timings of the respective sections in the reader/writer unit 27 from when the data in the transmitting buffer 3 is transmitted to the wireless tag 60 until the receiving buffer 25 receives the data from the wireless tag 60. FIG. 10 assumes that the anticipation signal 32 is detected i.e., the anticipation signal 32 is an "H." References 7c, 7d, 9c, 11c, 11d, 12c, 12d, 13c, 33d, 33c, 14c, 14d, 19a, 22a, and 23a denote conditions of the respective signals in FIG. 1.

The controller 1 sets the transmission initiation register 11 to an "H." The transmission controller 6 receives an "H" (11c in FIG. 10), "L" (12c in FIG. 10), and "L" (13c in FIG. 10) from the transmission initiation register 11, BUSY FLAG register 12, and the error FLAG register 13, respectively. Then, the transmission controller 6 sets the T-address pointer 5 to "OH" (14c FIG. 10), so that the T-address pointer 5 generates the trigger 7. The "OH" represents zero in hexadecimal.

Upon receiving the trigger 7, the modulation data producing section 9 converts the data received from the transmitting buffer 3, into the transmission format. The modulation data producing section 9 then outputs the data in the transmission format as the modulating data 10 to the modulation circuit 15 and the receiving data determining section 20. The modulation data producing section 9 also outputs the BUSY FLAG setting signal 8 (8c in FIG. 10). The modulation data 10 contains SOF (Start of Frame)+data+DATA CRC+EOF (End of Frame).

The modulation circuit 15 receives the modulation data 10 in a binary signal from the modulation data producing section 9, and performs ASK-modulation. The ASK-modulated signal is amplified by the output amplifier 16 and then is radiated from the antenna 17.

Upon receiving the anticipation signal 32 (i.e., "H"), the anticipation signal latch 30 outputs the reset signal 31, thereby resetting the transmission initiation register 11 (31c in FIG. 10).

In the wireless tag 60, the alternating magnetic field produced by the antenna 17 induces a voltage across the antenna 50. The rectifier 52 rectifies the voltage across the antenna 50 to supply electric power to the respective sections within the wireless tag 60. The detection circuit 53 demodulates the ASK-modulated signal, received together with the alternating magnetic field, into a binary signal. The demodulated signal is then outputted to the receiving data determining section 54.

The receiving data determining section 54 extracts the data from the receiving signal demodulated in the detection circuit 53, then decodes the demodulated instructions, and then detects the carrier signal, and finally outputs the response code 56 and the carrier detection signal 55 to the modulation data producing section 58. If the instruction obtained by decoding the demodulated signal describes a read/write operation, the receiving data determining section 54 accesses the non-volatile memory 57 by way of the non-volatile memory access signal 59.

The non-volatile memory 57 stores the data and outputs the data in accordance with the non-volatile memory access signal 59. The results of reading data from and writing data into the non-volatile memory 57 are outputted to the receiving data determining section 54 by way of the non-volatile memory access signal 59.

Upon receiving the carrier detection signal 55 and the response code 56, the modulation data producing section 58 converts the response code 56 into the transmission format, i.e., SOF (Start of Frame)+response data+DATA CRC+EOF (End of Frame). The response code 56 responds to the instructions contained in the demodulated signal. The modulation data producing section 58 causes the load switch to ON and OFF in accordance with the response code 56, thereby transmitting the data.

The receiving amplifier 18 receives and amplifies the signal appearing across the terminals of the antenna 17, and then outputs the amplified signal to the detection circuit 19. The detection circuit 19 demodulates the load switching signal received from the wireless tag 60 into a binary signal, and then outputs the binary signal to the receiving data determining section 20 (19a FIG. 10).

The receiving data determining section 20 checks the data format and CRC of the binary signal (response data from the wireless tag 60) received from the detection circuit 19. If the check results are acceptable, then the receiving data determining section 20 does not output the error FLAG setting signal 21 to the error FLAG register 13 but outputs the BUSY FLAG resetting signal 33 (33c FIG. 10) to the BUSY FLAG register 12. The receiving data determining section 20 also outputs the received data 23, i.e., the response data from the wireless tag 60 together with the receiving buffer address increment 22 to the receiving buffer 25 (23c in FIG. 10).

Once the BUSY FLAG register 12 has been reset, the transmission controller 6 receives an "L" (11d in FIG. 10) from the transmission initiation register 11, an "L" (12d in FIG. 10) from the BUSY FLAG register 12, and an "L" (13d in FIG. 10) from the error FLAG register 13, thereby not incrementing the T-address pointer 5 (14d in FIG. 10). Thus, the trigger 7 (7d in FIG. 10) is not generated. This stops transmission of data to the wireless tag 60. Thus, the embodiment allows the transmission of data to be completed within a time period (i.e., T2-T4) from when the anticipation signal becomes an "H" until the distance D between the wireless tag 60 and the reader/writer unit 27 is less than DL.

For more reliable performance, the apparatus is configured so that the transmission of data is completed within a time length (i.e., T2-T3) from when the anticipation signal becomes an "H" until the locking mechanism 116 unlocks the first portion 200b and the second portion 200a from each other. This ensures that the transmission of data may be halted, irrespective of the operation of the opening and closing mechanism of the cover, well before the distance D between the wireless tag 60 and the reader/writer unit 27 reaches DL.

As described above, the micro switch 130 outputs the anticipation signal 32 during the time period when the switch lever 118 moves from the locked position (FIG. 4) to the unlocked position (FIG. 7A). The micro switch 130 outputs the anticipation signal 32 so that the reader/writer unit 27 completes writing data well before the distance between the wireless tag 60 and the antenna 17 becomes longer than the critical value DL.

The micro switch 130 detects the movement of the locking mechanism 116 to detect when the reader/writer unit 27 and the wireless tag 60 will come apart soon, thereby anticipating that data communication between the reader/writer unit 27 and the wireless tag 60 will fail soon. This allows the reader/writer unit 27 to halt the subsequent data access to the wireless tag 60 once the current access to the data in the wireless tag 60 has been completed. In other words, the embodiment prevents the data from being corrupted when data is being written into the non-volatile memory 57. Specifically, the embodiment prevents data corruption that would otherwise occurs if the data communication fails after the data at the specified address 57 has been erased and before new data is written into the same address.

As described above, with the electronic apparatus 200 according to the embodiment, when data corruption is anticipated, the writing of data is halted upon reception of the anticipation signal 32. This eliminates the need for making a backup copy of the data in a separate area in the non-volatile memory 57 or for storing a hash value into a separate address. Thus, the capacity of the non-volatile memory 57 can be as small as possible.

Because the writing of data whose corruption is anticipated is stopped upon reception of the anticipation signal, when the data is read, there is no need for determining whether the data is the same as the original data.

Second Embodiment

FIG. 11 is a schematic block diagram illustrating the configuration of a power supply section for an electronic apparatus according to a second embodiment.

The second embodiment differs from the first embodiment in that an anticipation signal is generated by a power supply section 36 instead of by the micro switch 130. The remaining portion of the configuration is the same as the first embodiment and the description thereof is omitted.

Referring to FIG. 11, the power supply section 36 includes a detection section 71 and an output section 72. The detection section 71 detects the decrease in the voltage of an AC power line to generate an anticipation signal 32a and the output section 72 outputs the anticipation signal 32a to a reader/writer unit 27 based on the detection result of the detection section 71. The anticipation signal 32a indicates that power failure will occur within a predetermined time period.

The power supply section 36 also includes a voltage output section 73 and an energy storing section 74. The voltage output section 73 produces an appropriate voltage from the AC power line and supplies a supply voltage 28 to the reader/writer unit 27. The energy storing section 74 takes the form of a large capacitor or a battery that temporarily stores the output power required for maintaining the supply voltage 28 for a predetermined length of time. When power failure of the AC power line occurs, the energy storing section 74 supplies electric energy for at least a time period required for the data being processed to be safely stored into a non-volatile memory 57. In other words, when the voltage goes down suddenly due to power failure of the AC power line, the output voltage of the power supply section 36 will not quickly drop but gradually decrease, thereby ensuring that there is a certain length of time after the occurrence of power shut-off before the supply of voltage to the reader/writer unit 27 reaches a lower limit voltage VL.

Therefore, the communication of data is possible during a time length from when power failure occurs until the power supply voltage reaches a lower limit voltage VL. The communication of data will fail only after the power supply voltage has decreased below the lower limit voltage VL.

FIG. 12 is a timing chart illustrating the anticipation signal 32a and the change in the supply voltage 28. Referring to FIG. 12, the anticipation signal 32a is an "L" at timing T5 (e.g., before power failure occurs). The voltage V1 of the supply voltage 28 for the reader/writer unit 27 is higher than the lower limit voltage VL.

When power failure occurs at timing T6, the anticipation signal 32a goes high and the voltage V1 of the supply voltage 28 begins to gradually decrease but is still much higher than the lower limit voltage VL. Therefore, the data in the receiving buffer 25 could be stored into a non-volatile memory, not shown. However, in the second embodiment, the transmission of data from the transmitting buffer 3 is prevented during a period C6. This is because if the transmission of data from the transmitting buffer 3 is initiated in the period C6, the supply voltage 28 will have decreased below the lower limit VL by the time the transmitted data begins to be actually received in the wireless tag 60, causing corruption of data.

At timing T7, the voltage V1 of the supply voltage 28 becomes lower than the lower limit voltage VL, so that the reader/writer unit 27 is absolutely inoperable during a period C7. Because the anticipation signal 32a generated at the timing T6 prevents further data transmission, new data is not received in the wireless tag 60 and therefore no data corruption occurs.

After timing T8 (a period C8), the voltage V1 of the supply voltage 28 is constant and remains lower than the lower limit voltage VL. During the period C8, the writing of data cannot be performed. Because no new data is received in the wireless tag 60, no corruption of data occurs.

The remaining operation is much the same as the first embodiment and therefore the description thereof is omitted.

In the second embodiment, power failure is detected in terms of the decrease in the output voltage of the power supply section 36 and the anticipation signal is outputted to the reader/writer unit 27. Thus, the reader/writer unit 27 prevents access to the data in the wireless tag 60 after completion of access to the data currently being transmitted to the wireless tag 60.

In response to the anticipation signal 32a, the second embodiment stops writing data that would otherwise be corrupted. Thus, there is no need to store a backup copy of data into another address of the non-volatile memory 57 and a hash value into still another address. Thus, the capacity of the non-volatile memory 57 can be as small as possible.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An electronic apparatus comprising:
    an accommodating section to which a wireless tag sub unit is detachably attached, the sub unit including a wireless tag therein;
    a reader-and-writer unit that communicates with the wireless tag to read data from the wireless tag and write data into the wireless tag when said reader-and-writer unit remains locked to said accommodating section; and
    a mechanism that causes said reader-and-writer unit and said accommodating section to lock to each other and to unlock from each other;
    an anticipation signal generator that includes a detection section that detects when the mechanism will unlock the reader-and-writer unit and the wireless tag from each other and that generates an anticipation signal, the anticipation signal being indicative that communication between the wireless tag and said reader-and-writer unit is anticipated to fail, wherein the anticipation signal is provided to said reader-and-writer unit after said mechanism has begun to unlock said reader-and-writer unit and said accommodating section from each other, and before said mechanism has completely unlocked said reader-and-writer unit and said accommodating section from each other;
    wherein the reader-and-writer unit stops communicating with the wireless tag in response to the anticipation signal.

2. The electronic apparatus according to claim 1, wherein said reader-and-writer unit is mounted to an opening-and-closing member that opens and closes relative to said accommodating section;
    wherein said mechanism is mounted to the opening-and-closing member, and locks the opening-and-closing member to said accommodating section and unlocks the opening-and-closing member from the accommodating section.

3. The electronic apparatus according to claim 2, wherein when said mechanism unlocks the opening-and-closing member from said accommodating section, the opening-and-closing member is allowed to open and close relative to said accommodating section.

4. The electronic apparatus according to claim 2, wherein said mechanism includes an operation portion and is pivotal relative to the opening-and-closing member;
    wherein said detection section is mounted to the opening-and-closing member, and includes a detection element facing the operation portion;
    wherein when said mechanism pivots relative to the opening-and-closing member, depressing the detection element, said detection section generates the anticipation signal.

5. The electronic apparatus according to claim 2, wherein the opening-and-closing member is pivotally mounted to said accommodating section.

6. The electronic apparatus according to claim 3, wherein the opening-and-closing member is a lid that covers said accommodating section;
    wherein when the opening-and-closing member is locked to said accommodating section, the wireless tag faces said reader-and-writer unit.

7. The electronic apparatus comprising:
    an accommodating section to which a sub unit is detachably attached, the sub unit including a wireless tag therein;
    a lid hingedly mounted to said accommodating section, said lid opening and closing relative to said accommodating section;
    a reader-and-writer unit mounted to said lid, wherein when said lid has been closed, said reader-and-writer unit faces the wireless tag and communicates with the wireless tag to read data from the wireless tag and to write data into the wireless tag;
    a mechanism pivotally mounted to said lid, said mechanism causing said lid and said accommodating section to lock to each other or to unlock from each other;
    an anticipation signal generator that includes a detection section that detects when the mechanism will unlock the reader-and-writer unit and the wireless tag from each other and that generates an anticipation signal, the anticipation signal being indicative that communication between the wireless tag and said reader-and-writer unit is anticipated to fail, wherein the anticipation signal is provided to said reader-and-writer unit after said mechanism has begun to unlock said reader-and-writer unit and said accommodating section from each other, and before said mechanism has completely unlocked said reader-and-writer unit and said accommodating section from each other;
    wherein said reader-and-writer unit terminates the communication between said wireless tag and said reader-and-writer unit in response to the anticipation signal.

8. The electronic apparatus according to claim 7, wherein said mechanism includes an operation portion that pivots in unison with said mechanism;
    wherein said anticipation signal generator is mounted to said lid, and includes a detection element that faces the operation portion;
    wherein when said mechanism pivots such that the operation portion depresses the detection element, said anticipation signal generator generates the anticipation signal.

9. The electronic apparatus according to claim 3 further comprising a lid that opens and closes said accommodating section and to which said reader-and-writer unit is mounted;
    wherein the position at which the reader-and-writer unit communicates with the wireless tag normally includes a position at which said lid closes said accommodating section.

10. The electronic apparatus according to claim 7, wherein said mechanism locks said lid to close said accommodating section.

11. The electronic apparatus according to claim 8, wherein said mechanism locks said lid to close said accommodating section.

12. The electronic apparatus according to claim 9, wherein said mechanism locks said lid to close said accommodating section.

13. The electronic apparatus according to claim 1 further comprising an image forming section that forms an image on a recording medium and the sub unit is a part of the image forming section.

14. The electronic apparatus according to claim 13, wherein the sub unit includes a toner cartridge that is detachably attached to the sub unit, and said wireless tag is mounted to the toner cartridge.

15. An electronic apparatus comprising:

a data storing unit that is detachably attachable;

a data writing section that writes data into said data storing unit when said data storing unit has been attached in position;

a lid on which said data writing section is mounted, said lid being movable to open and close with respect to said data storing section such that when said lid is opened, a distance between said data writing section and said data storing section increases;

a mechanism that locks and unlocks said lid; and a detection section that outputs a detection signal, the detection signal anticipating that said mechanism will unlock from said lid, wherein the detection signal is provided to said data writing section if the distance between said data writing section and said data storing unit is anticipated to become longer than a predetermined value at which the communication between said data storing unit and said data writing section fails, the detection signal being provided to said data writing section after said mechanism has begun to unlock said data writing section and said accommodating section from each other, and before said mechanism has completely unlocked said data writing section and said accommodating section from each other;

wherein writing data into said data storing unit is halted in accordance with the detection signal.

16. The electronic apparatus according to claim 8, wherein said detection section is an electrical switch.

17. An electronic apparatus comprising:

an accommodating section to which a subunit is detachably attached, the sub unit including a wireless tag therein;

a reader-and-writer unit that communicates with the wireless tag to read data from the wireless tag and write data into the wireless tag when said reader-and-writer unit remains locked to said accommodating section; and a mechanism that causes said reader-and-writer unit and said accommodating section to lock to each other and to unlock from each other, wherein when said mechanism is movable in a first stroke of movement where said mechanism has begun to unlock said reader-and-writer unit and said accommodating section from each other, and before said mechanism has unlocked said reader-and-writer unit and said accommodating section from each other, and in a second stroke of movement where said mechanism has unlocked said reader-and-writer unit and said accommodating section from each other; and an anticipation signal generator that includes a detection section that detects when the mechanism will unlock the reader-and-writer unit and the wireless tag from each other and that generates an anticipation signal indicating that communication between the wireless tag and said reader-and-writer unit is anticipated to fail, the anticipation signal being generated when said mechanism is in the first stroke of movement;

wherein said reader-and-writer unit stops communicating with the wireless tag in response to the anticipation signal.

* * * * *

UNITED STATES PATENT AND TRADEMARK OFFICE
CERTIFICATE OF CORRECTION

PATENT NO. : 7,621,452 B2 Page 1 of 1
APPLICATION NO. : 11/217969
DATED : November 24, 2009
INVENTOR(S) : Yoichi Hayakawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 930 days.

Signed and Sealed this

Twenty-sixth Day of October, 2010

David J. Kappos
*Director of the United States Patent and Trademark Office*